A. DICKERSON.

Making Iron Direct from Ore.

No. 101. Reissued Aug. 21, 1847.

N. PETERS, Photo-Lithographer, Washington, D. C.

UNITED STATES PATENT OFFICE.

ALEXANDER DICKERSON, OF NEWARK, NEW JERSEY.

IMPROVEMENT IN APPARATUS FOR THE MANUFACTURE OF MALLEABLE IRON.

Specification forming part of Letters Patent No. 5,013, dated March 13, 1847; Reissue No. 101, dated August 21, 1847.

*To all whom it may concern:*

Be it known that I, ALEXANDER DICKERSON, of the city of Newark, in the county of Essex and State of New Jersey, have invented a new and useful method of manufacturing malleable or wrought iron direct from the ore, and in the construction of the furnace for doing the same, which is described as follows, reference being had to the annexed drawings of the same, making part of this specification, of which—

Figure 1:
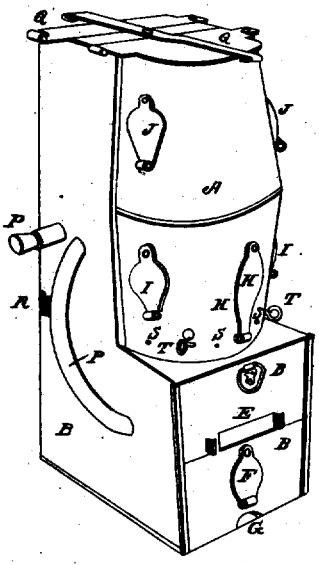
Figure 2:
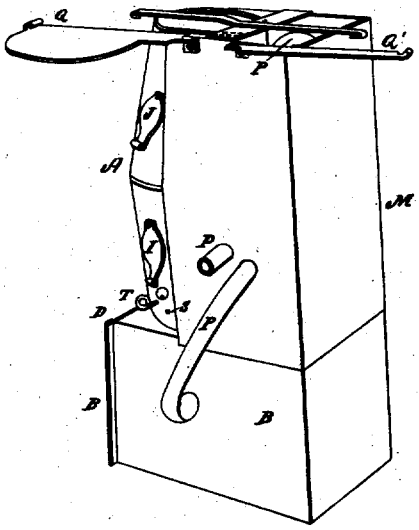
Figure 3:
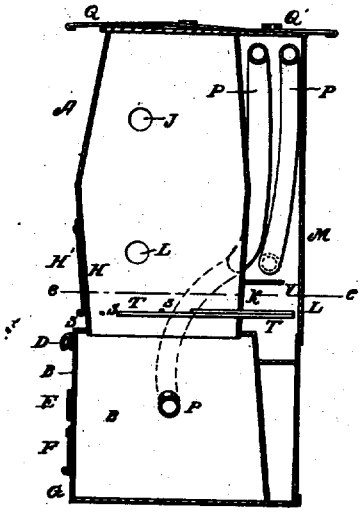
Figure 4:
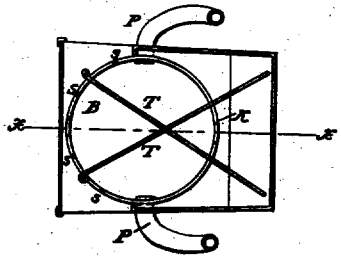

Figure 1 is a perspective view of the front of the furnace, and of the left side thereof. Fig. 2 is a perspective view of the back of the furnace, and the right side thereof, showing the doors of the charging-cylinder, and of the oven containing the hot-blast tubes, open, which in Fig. 1 are represented closed. Fig. 3 is a vertical longitudinal section at the line *x x* of Fig. 4. Fig. 4 is a horizontal section on the line *o o* of Fig. 3.

My method of making malleable or wrought iron direct from the ore is effected by means of a new combination and arrangement of parts, hereinafter described and represented—to wit, by arranging a chamber, A, for containing the charge with a chamber or box, B, arranged below it, for containing a portion of the charge and the loop, which is formed in said chamber B, having doors Q Q′ at the top of the charging-chamber, for admitting the charge, and a door, D, in the front of the chamber B, for closing the opening or mouth thereof, through which the loop is taken out, and for excluding the entrance of cold air to the ignited fuel in said chamber B, with ovens L and M, back of the charging-cylinder, for reheating the loop, and for heating the blast-pipes by means of the surplus heat from the chamber A, passing through a flue, K, into the lower oven, L, and out at the top of the upper oven, when the door Q′ at top is open, and with doors H and I in the sides of the charging-chamber, through which to introduce suitable implements for working down the ore and coal, and valves J, to admit air, and to discharge impure gases and regulate the heat, and a slide or door, R, for closing the the mouth of the oven, and apertures S in the sides of the charging-chamber, near the lower end, through which to insert iron bars T, forming a temporary grate to hold up the heated coal and ore while taking out the loop below.

The box or chamber B for receiving a portion of the charge, and in which the loop is formed, and into which the blast enters, is made in the usual manner in which forge-fires or hearths are now made for manufacturing wrought-iron direct from the ore, except that the opening through which the loop is taken out, which is usually left open, I keep closed by a slide or door, D, for excluding cold air from the ignited fuel, thereby increasing and retaining the heat in the said box or chamber B, as well as in the charging-chamber A, which said door D is also intended for the purpose of removing the loop, when necessary, by opening the said door. In this door D is a smaller door or slide, E, to be opened at pleasure to ascertain the temperature of the loop. There is also an additional slide, F, near the bottom of the box or chamber B, and above the usual cinder-hole, G, for the purpose of tapping and drawing off cinder, as may be required during the making of the loop. The box or chamber B should be made of the usual material, size, and form, or otherwise, as preferred, and slightly gathered over at the top, or where it unites with the upper chamber, A. The charging-chamber A is placed directly over the box B, and into this chamber A the fuel and ore are introduced in proper quantities, which may be kept continually charged from the mouth of the chamber by opening the door Q. This chamber A may be made cylindrical, conical, funnel-shaped, barrel-shaped, or of any suitable form preferred, and of any proper material, size, and thickness, but to be made perfectly tight by closing all the slides and doors. It should be provided in front with a long opening, H, at or near the bottom of the chamber, directly over the box B, covered with a slide, H′, for the purpose of admitting a suitable instrument for working down the iron when in a glutinative or pasty state, called "flourished iron," into the box B. There are also two side apertures, I I, in the lower part of the chamber A, covered with slides, said apertures being designed to admit suitable instruments for the purpose of working down the coal and heated ore sufficiently fast to prevent clogging. The two apertures J J in the upper part of the chamber are for the purpose of admitting or ejecting air, as may be necessary, to expel impure gases, and to keep the heat at any required temperature. There are also apertures S S S near the bottom of the chamber A, into which iron bars T, or slides, are inserted, forming a temporary grate to hold up the heated coal and ore while taking out the loop below, which, when taken out, admit of the said bars being removed and a second loop commenced forming immediately, the apertures being then closed with small slides. All the apertures and openings above named are covered with suitable doors, slides, or valves to keep the chamber tight, or generally so, during the process of smelting the charge of ore. The oven L, in which the loops or blooms are reheated for drawing out by the surplus heat passing from the charging-chamber A through the flue K into the oven L, in combination with a small quantity of additional coal introduced to the oven L through the door R, is arranged behind the chamber A, and connected with it and with the oven M, placed or arranged above it and behind the said charging-chamber A, and communicates with the said oven M by a flue, V, which oven M has a door, Q′, at the top, opening into the atmosphere, for letting off the heat and gases when open, as shown in Fig. 2, or for confining them in the oven when closed, as shown in Fig. 1. The reheating of the loops is done by the flame passing from the back of the chamber A into the oven L, in connection with the additional fuel. After the flame passes through the oven L, it enters into a chamber or upper oven, M, through the flue V, immediately over the lower oven, L, in which oven M are placed cast-iron blast-pipes P, through which the blast passes, and is heated to any desired temperature, regulated by the slide-valve Q′ at the top. The mouth of the oven is closed by the slide R.

The bars T T may be made hollow for holding water to prevent burning out or sagging or melting.

What I claim as my invention, and desire to secure by Letters Patent, is—

1. The method of manufacturing malleable or wrought iron direct from the ore by means of a furnace, combining a chamber containing the charge of ore and fuel with a closed forge-fire below the same and communicating therewith, containing a continuation of the charge and the loop of wrought iron formed therein, said forge-fire being provided with a large door for the introduction of a portion of the charge, for shutting in and confining the charge, excluding the air therefrom during the process, removing the loop when formed, and clearing out the fire, preparatory to another charge.

2. The use of movable bars or slides in combination with the said closed forge-fire and chamber, inserted and passing through the charge, to serve as a temporary grating to sustain the upper portion of the charge, or a new charge, while the lower portion is burning down and the loop is taken out.

ALEXANDER DICKERSON.

Witnesses:
JACOB POWERS,
JOSEPH H. JACKSON.